United States Patent
Sandberg et al.

(10) Patent No.: US 12,238,047 B2
(45) Date of Patent: Feb. 25, 2025

(54) METHOD AND NETWORK NODE FOR INTERFERENCE MITIGATION FOR TDD UL/DL CONFIGURATION

(71) Applicant: Telefonaktiebolaget LM Ericsson (publ), Stockholm (SE)

(72) Inventors: Sara Sandberg, Luleå (SE); Arne Simonsson, Gammelstad (SE); Kristofer Sandlund, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 311 days.

(21) Appl. No.: 17/771,244

(22) PCT Filed: Oct. 23, 2019

(86) PCT No.: PCT/SE2019/051045
§ 371 (c)(1),
(2) Date: Apr. 22, 2022

(87) PCT Pub. No.: WO2021/080479
PCT Pub. Date: Apr. 29, 2021

(65) Prior Publication Data
US 2022/0407672 A1 Dec. 22, 2022

(51) Int. Cl.
*H04L 5/14* (2006.01)
*H04B 17/336* (2015.01)
(Continued)

(52) U.S. Cl.
CPC ......... *H04L 5/1469* (2013.01); *H04B 17/336* (2015.01); *H04L 1/0003* (2013.01); *H04L 1/1812* (2013.01)

(58) Field of Classification Search
CPC ....... H04L 5/1469; H04L 5/1453; H04L 5/14; H04L 1/1812; H04L 1/1822;
(Continued)

(56) References Cited

U.S. PATENT DOCUMENTS

| | | |
|---|---|---|
| 2013/0094387 A1 | 4/2013 | Susitaival et al. |
| 2015/0124709 A1 | 5/2015 | Ren et al. |

(Continued)

FOREIGN PATENT DOCUMENTS

| | | |
|---|---|---|
| CN | 105164948 A | 12/2015 |
| EP | 2586255 A1 | 5/2013 |

(Continued)

OTHER PUBLICATIONS

Extended European Search Report Patent Application No. EP 19949591.2 mailed on Apr. 6, 2023, 9 pages.

(Continued)

*Primary Examiner* — Phong La
(74) *Attorney, Agent, or Firm* — Sage Patent Group

(57) ABSTRACT

There is presented a method for a network node for reducing interference in a wireless device (200), the wireless device operating using a time division0duplex. TDD, configuration in a cell, from at least another wireless device operating in a neighbouring cell using another TDD configuration. The TDD configuration is divided into different time units for at least downlink, DL, and uplink. UL, transmission. The method includes assigning time units in the TDD configuration to one of at least two time unit groups, where the assignment of a time unit to a time unit group is based the interference from the neighboring cell using the another TDD configuration. The method further includes using different link adaptions for the at least two time unit groups. The is also presented a network node.

15 Claims, 10 Drawing Sheets

601
Assigning time units in the TDD configuration to one of at least two time unit groups 602
Using different link adaptations for the at least two time unit groups

(51) Int. Cl.
  *H04L 1/00* (2006.01)
  *H04L 1/1812* (2023.01)
(58) Field of Classification Search
  CPC ....... H04L 1/1825; H04L 1/1809; H04L 1/18; H04L 1/0003; H04L 1/0002; H04B 17/336; H04B 17/345; H04B 17/346; H04B 17/309; H04B 17/347
  See application file for complete search history.

(56) References Cited

U.S. PATENT DOCUMENTS

| | | | | |
|---|---|---|---|---|
| 2018/0124718 | A1* | 5/2018 | Ng | H04B 7/15 |
| 2020/0067614 | A1* | 2/2020 | Wang | H04J 11/0056 |
| 2021/0076384 | A1* | 3/2021 | MolavianJazi | H04B 17/318 |
| 2022/0086843 | A1* | 3/2022 | Ying | H04B 17/318 |
| 2022/0095240 | A1* | 3/2022 | Ying | H04B 17/336 |
| 2022/0095283 | A1* | 3/2022 | Wei | H04L 5/14 |
| 2022/0103333 | A1* | 3/2022 | Ghozlan | H04W 88/08 |
| 2022/0201524 | A1* | 6/2022 | Ying | H04W 74/0866 |
| 2022/0248383 | A1* | 8/2022 | Park | H04W 72/27 |
| 2022/0407672 | A1* | 12/2022 | Sandberg | H04B 17/336 |

FOREIGN PATENT DOCUMENTS

| | | | | |
|---|---|---|---|---|
| EP | 3066775 | A1 | 9/2016 | |
| EP | 3142402 | A1 | 3/2017 | |
| WO | 2014098915 | A1 | 6/2014 | |
| WO | WO-2014107122 | A1 * | 7/2014 | ........... H04L 1/1812 |
| WO | 2015068071 | A1 | 5/2015 | |
| WO | 2018126932 | A1 | 7/2018 | |
| WO | WO-2018126792 | A1 * | 7/2018 | ......... H04L 27/2613 |
| WO | WO-2018172620 | A1 * | 9/2018 | ............ H04W 72/04 |

OTHER PUBLICATIONS

Office Action mailed May 17, 2024 for Chinese Patent Application No. 201980101678.X, 13 pages.
3GPP, "3rd Generation Partnership Project; Technical Specification Group Radio Access Network; Further Enhancements to LTE TDD for DL-UL Interference Management and Traffic Adaptation; (Release 11)", 3GPP TR 36.828 V2.0.0, Jun. 2012, 1-109.
Nokia, et al., "Cross-link interference management for dynamic TDD", 3GPP TSG RAN WG1 NR #90, R1-1714265, Prague, Cezch Republic, Aug. 21-25, 2017, 1-7.
Shen, Zukang, et al., "Dynamic Uplink-Downlink Configuration and Interference Management in TD-LTE." Technology Updates on LTE Advanced, IEEE Communications Magazine, Nov. 2012, 51-59.
Unknown, Author, "3rd Generation Partnership Project; Technical Specification Group Radio Access Network; Evolved Universal Terrestrial Radio Access (E-UTRA); Physical channels and modulation (Release 15)", 3GPP TS 36.211 V15.7.0, Sep. 2019, pp. 1-239.
Unknown, Author, "3rd Generation Partnership Project; Technical Specification Group Radio Access Network; NR; Physical channels and modulation (Release 15)", 3GPP TS 38.211 V15.7.0, Sep. 2019, pp. 1-97.

* cited by examiner

METHOD AND NETWORK NODE FOR INTERFERENCE MITIGATION FOR TDD UL/DL CONFIGURATION

Embodiments presented herein relate to a method for a network node, a network node, a computer program, and a computer program product for reducing the impact of interference from at least another wireless device operating in a neighbouring cell using another TDD configuration.

BACKGROUND

The 5G NR (New Radio) is the latest in the series of 3GPP cellular standards which supports very high data rate and with lower latency compared to its predecessor LTE (4G) and 3G/2G technology.

Transmission and reception from a node, e.g., a terminal or user equipment (UE) and base station in a cellular standard such as NR or LTE, may be multiplexed in the frequency domain or in the time domain (or combinations thereof). Frequency Division Duplex (FDD) as illustrated to the left in FIG. 1 implies that downlink (DL) and uplink (UL) transmission take place in different, sufficiently separated, frequency bands. Time Division Duplex (TDD), as illustrated to the right in FIG. 1, implies that downlink and uplink transmission take place in different, non-overlapping time slots. Thus, TDD can operate in unpaired spectrum, whereas FDD requires paired spectrum.

In LTE as well as NR, neighboring cells typically have the same uplink-downlink configuration to avoid severe interference between uplink and downlink transmissions. This makes it difficult to dynamically change uplink-downlink configuration according to current traffic patterns.

Networks of different operators in the same area may be operated in adjacent frequencies. Due to independent UL power control among different cells and different operators, the transmit power of UEs from different operators cannot be controlled, which could result in severe interference when the UEs have large path losses to their serving base stations and large transmit powers are used to compensate for the path losses. For example, the spectrum mask required adjacent channel suppression (often in the order of 30-40 dB compared to the transmit power) is smaller than the path loss difference between the other operators UE and own base station. This implies that for example two UEs belonging to people travelling with the same bus and using different operator networks operated on adjacent frequencies may cause significant interference to each other. If the operator networks use different TDD uplink-downlink configurations, the amount of so-called cross-link interference can be substantial.

To enable coexistence with reasonable power and spectrum constrains, the government agency for IT and telecommunications in some countries, such as Post och Telestyrelsen in Sweden (PTS), have specified a fixed TDD pattern. For a new NR sub-6 spectrum in Australia, ACMA specify operator synchronization and a fixed TDD pattern matching LTE config 1. The potential spectrum utilization improvement that could be achieved with dynamic TDD is then not utilized.

If neighboring cells or operators with adjacent frequency bands are allowed to have different uplink-downlink configurations, there may be several cases of severe cross-link interference. For example, a UE on the cell edge receiving downlink may be significantly interfered by a nearby UE simultaneously transmitting in uplink to a neighboring base station with a different uplink-downlink configuration, as shown in FIG. 2. FIG. 2 shows a network node and a wireless device operating in one cell using a TDD configuration (TDD configuration A), and another network node and another wireless device operating in another neighboring cell using another TDD configuration (TDD configuration B). There may be interference, crosslink interference between the network nodes and between the wireless devices because they operate in the neighboring cells operating using different TDD configurations.

Even though the channel is changing slowly, interference may vary quickly in a slot-periodic pattern depending on the uplink-downlink configurations selected for adjacent cells. Adjacent cells operated by the same operator typically use the same frequency band and cross-link interference in the case of different uplink-downlink configurations may be severe, especially on the cell-edge. Adjacent cells operated by different operators on adjacent frequency bands and using different TDD configurations may experience less cross-link interference due to the spectrum mask required adjacent channel suppression. However, adjacent cells operated by different operators may be overlapping almost completely geographically (they may even use the same tower for their antennas) and the cross-link interference problem will therefore typically be significant in all parts of the cell, not only on the cell-edge.

The level of the interference in the UL-DL colliding sub-frames or slots will depend on UE individual position both for the co-channel case (adjacent cells) and the adjacent channel case (e.g. different operators). If UEs are well separated there will not be any significant interference, especially for the adjacent channel case where adjacent channel suppression is applied.

Cross-link interference from a UE transmitting in uplink to a nearby UE in an adjacent cell that is trying to receive a downlink transmission is one example. Another example of significant cross-link interference is downlink transmission in one cell, where the UE is in the direction of a neighboring base station, which may be interfered by the downlink transmission while receiving uplink transmission from a UE in its own cell. In this case it is beam/antenna direction as well as receiver combining ("receive beam direction") that is relevant rather than the exact location of the UEs.

If the operators' networks are not synchronized and use different TDD pattern configurations, the interference can differ periodically between different subframes or slots.

SUMMARY

According to one aspect, a method in a network node is provided. The method is performed in network node for reducing the impact of interference in a cell from at least another neighbouring cell. The cell operates using a time division duplex, TDD, configuration, and the neighbouring cell operating using another TDD configuration. The TDD configurations are divided into different time units for at least downlink, DL, and uplink, UL, transmissions. The method includes assigning time units in the TDD configuration to one of at least two time unit groups. The assignment of a time unit to a time unit group is based on the another TDD configuration used in the neighbouring cell. The method further includes using different link adaptation methods for the at least two time unit groups.

According to another aspect, a network node is provided. The network node is configured to reduce the impact of interference in a cell from at least another neighbouring cell. The cell configured to operate using a time division duplex, TDD, configuration, and the neighbouring cell configured to operate using another TDD configuration. The TDD configurations are divided into different time units for at least downlink, DL, and uplink, UL, transmissions. The network node includes a processor and a memory for storing program code that is executed by the processor to perform operations including assign time units in the TDD configuration to one of at least two time unit groups. The assignment of a time unit to a time unit group is based on the another TDD configuration used in the neighbouring cell. The operations further includes use different link adaptation methods for the at least two time unit groups.

According to another aspect, a computer program is provided. The computer program reduces the impact of interference in a cell from at least another neighbouring cell. The cell operating using a time division duplex, TDD, configuration, and the neighbouring cell operating using another TDD configuration. The TDD configurations are divided into different time units for at least downlink, DL, and uplink, UL, transmissions. The computer program comprising computer code which, when run on processing circuitry causes the network node to assign time units in the TDD configuration to one of at least two time unit groups. The assignment of a time unit to a time unit group is based on the another TDD configuration used in the neighbouring cell. The computer program further causes the network node to use different link adaptation methods for the at least two time unit groups.

According to another aspect, a computer program product is provided. The computer program product comprising a computer program according to the above, and a computer readable storage medium on which the computer program is stored.

The time units in a TDD configuration are assigned to different time unit groups depending on how likely the time units are to experience interference, such as crosslink interference from another TDD configuration in a neighbouring cell using a different TDD configuration. In this way the time units can be assigned into time unit groups between on how likely it is that they will experience interference. Therefore, the data or control signalling can be transmitted in time units depending on how sensitive the date or control signalling is to errors, interference, or fault transmission. For example, the most sensitive or important data or control signalling may be transmitted in the time unit groups experience no or very little interference. Data and control signalling that is less sensitive may be transmitted in time units groups that will experience more interference, in particular, crosslink interference.

BRIEF DESCRIPTION OF THE DRAWINGS

The accompanying drawing figures incorporated in and forming a part of this specification illustrate several aspects of the disclosure, and together with the description serve to explain principles of the disclosure.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 3:
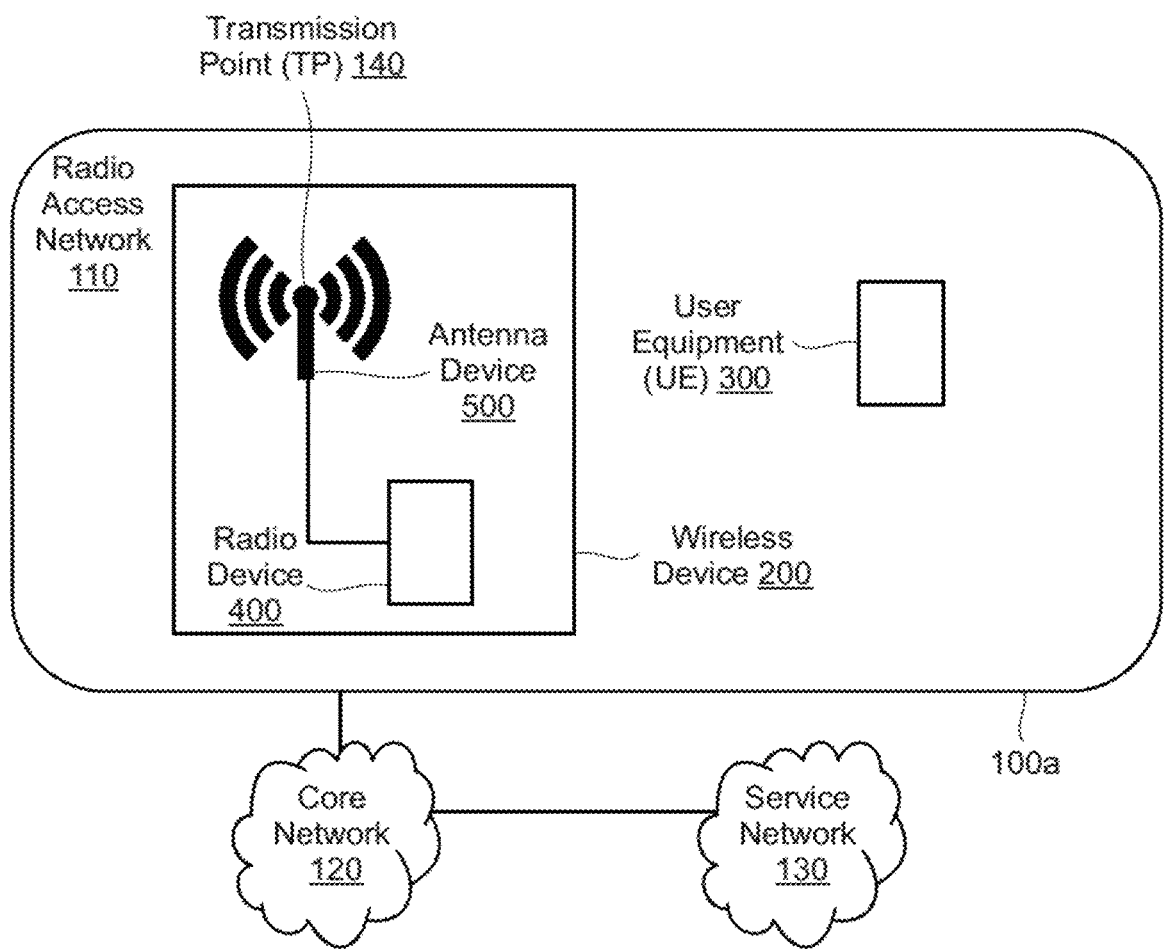
FIG. 3 a schematic diagram illustrating a communications network in accordance with a representative embodiment of the present disclosure.

FIG. 3 is a schematic diagram illustrating a communications network 100a where embodiments presented herein can be applied. The communications network 100a could be a third generation (3G) telecommunications network, a fourth generation (4G) telecommunications network, or a fifth (5G) telecommunications network and support any 3GPP telecommunications standard.

The communications network 100a comprises a transmission point, TP, 140 including an antenna device 500 which may be a Multiple-Input Multiple-Output (MIMO) antenna including two or more antennas. The antenna device 500 is connected to a radio device 400. The communications network 100a further includes the network node 200, which may include one or more TPs. The network node is configured to, in a radio access network 110, provide network access to a user equipment (UE) 300. The radio access network 110 is operatively connected to a core network 120. The core network 120 is in turn operatively connected to a service network 130, such as the Internet. The UE 300 is thereby, via network node and the transmission point 140, enabled to access services of, and exchange data with, the service network 130. Examples of network nodes are radio access network nodes, radio base stations, base transceiver stations, Node Bs, evolved Node Bs, g Node Bs, gNBs, access points, access nodes, antenna integrated radios (AIRs), and transmission and reception points (TRPs). A UE may also be referred to as a wireless device. Other examples of UEs are terminal devices, mobile stations, mobile phones, handsets, wireless local loop phones, smartphones, laptop computers, tablet computers, network equipped sensors, network equipped vehicles, and so-called Internet of Things devices.

Figure 4:
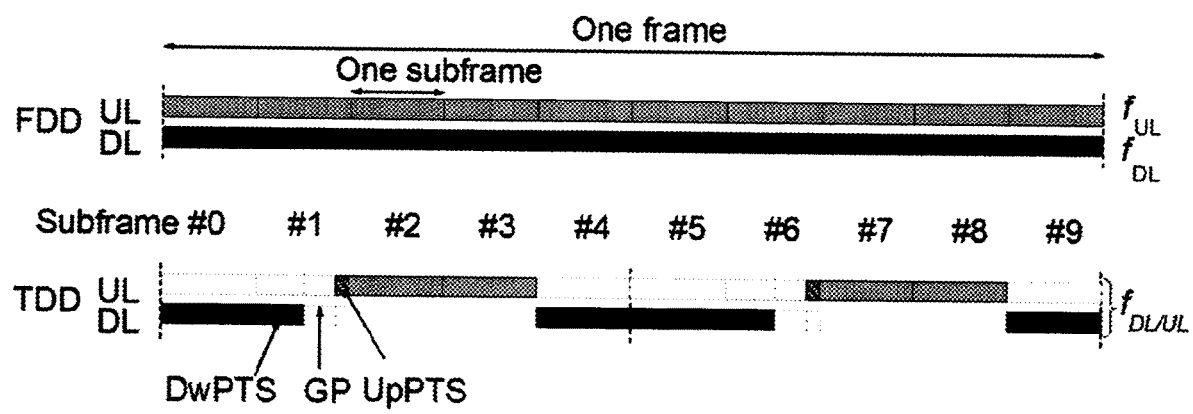
FIG. 4 shows structure of the transmitted signal in a communication system, according to an embodiment of the present disclosure.

Typically, the structure of the transmitted signal in a communication system is organized in the form of a frame structure. For example, LTE uses ten equally-sized subframes of length 1 ms per radio frame as illustrated in FIG. 4.

LTE and NR use Orthogonal Frequency Division Multiplexing (OFDM) in the downlink direction and a Discrete Fourier Transform (DFT)-spread OFDM in the uplink direction. The basic LTE downlink physical resource can thus be seen as a time-frequency grid, where each resource element corresponds to one OFDM subcarrier during one OFDM symbol interval. In the time domain, LTE downlink transmissions may be organized into radio frames of 10 ms, with each radio frame consisting of ten equally-sized subframes of length Tsubframe=1 ms.

Furthermore, the resource allocation in LTE is typically described in terms of resource blocks, where a resource block corresponds to one slot, e.g., 0.5 ms, in the time domain and 12 subcarriers in the frequency domain. A pair of two adjacent resource blocks in time direction, e.g., 1.0 ms, is known as a resource block pair. Resource blocks are numbered in the frequency domain, starting with 0 from one end of the system bandwidth.

NR terminology and LTE terminology coincide to a considerable extent; for instance, a resource element (RE) remains 1 subcarrier×1 OFDM symbol. Yet some terms known in LTE have been given a new meaning in NR. This disclosure, including the claims, applies prefixes "LTE" and "NR" when indefiniteness could otherwise arise.

Any term designating an object or operation known from LTE is expected to be reinterpreted functionally in view of NR specifications. Examples: An LTE radio frame may be functionally equivalent to an NR frame, considering that both have a duration of 10 ms. An LTE eNB may be functionally equivalent to an NR gNB, since their functionalities as downlink transmitter are at least partially overlapping. The least schedulable resource unit in LTE may be reinterpreted as the least schedulable resource unit in NR. The shortest data set for which LTE acknowledgement feedback is possible may be reinterpreted as the shortest data set for which NR acknowledgement feedback is possible.

Therefore, even though some embodiments of this disclosure have been described using LTE-originated terminology or NR-originated terminology, they remain fully applicable to NR technology or LTE technology, respectively. Further throughout the embodiments the term subframe is completely interchangeable with the term slot.

Figure 1:
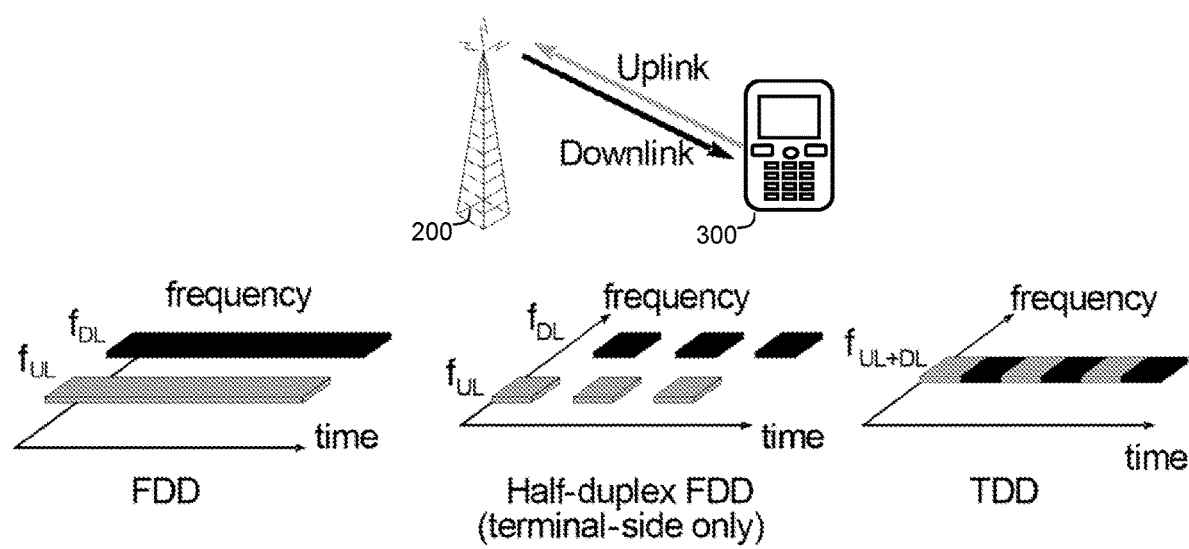
FIG. 1 illustrates example features of a node showing transmission and reception, according to an embodiment of the present disclosure.

In case of FDD operation, illustrated in the left part of FIG. 1, there are two carrier frequencies, one for uplink transmission (fUL) and one for downlink transmission (fDL). At least with respect to the terminal in a cellular communication system, FDD may be either full duplex or half duplex. In the full duplex case, a terminal may transmit and receive simultaneously, while in half-duplex operation, the terminal may not transmit and receive simultaneously. The base station is capable of simultaneous reception/transmission though, e.g., receiving from one terminal while simultaneously transmitting to another terminal. In LTE, a half-duplex terminal is monitoring/receiving in the downlink except when explicitly being instructed to transmit in a certain subframe.

In case of TDD operation, illustrated in the right part of FIG. 1, there is only a single carrier frequency and uplink and downlink transmissions are always separated in time also on a cell basis. As the same carrier frequency is used for uplink and downlink transmission, both the base station and the mobile terminals need to switch from transmission to reception and vice versa. An aspect of any TDD system is to provide the possibility for a sufficiently large guard time where neither downlink nor uplink transmissions occur. This is required to avoid interference between uplink and downlink transmissions. For LTE, this guard time is provided by special subframes, e.g., subframe 1 and, in some cases, subframe 6 of a frame, which are split into three parts: a downlink part (DwPTS), a guard period (GP), and an uplink part (UpPTS), as illustratively shown in FIG. 4. The remaining subframes are either allocated to uplink or downlink transmission.

TDD allows for different asymmetries in terms of the amount of resources allocated for uplink and downlink transmission, respectively, by means of different uplink-downlink configurations. In LTE, there are seven different configurations as shown in Table 1. It should be appreciated that a DL subframe may mean either DL or the special subframe.

In TDD, some subframes/slots/symbols are allocated for uplink transmissions and some subframes/slots/symbol's are allocated for downlink transmissions. The switch between downlink and uplink occurs in the so called special subframes (LTE) or flexible subframes (NR).

TABLE 1

LTE uplink-downlink configurations (from 36.211, Table 4.2-2)

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The size of the guard period (and hence the number of symbols for DwPTS and UwPTS in the special subframe) can also be configured from a set of possible selections.

NR on the other hand provides many different uplink-downlink configurations. There are 10 to 320 slots per radio frame (where each radio frame has a duration of 10 ms) depending on subcarrier spacing. Each slot can be configured with a slot format as shown in Table 2. The OFDM symbols in a slot are classified as 'downlink' (denoted 'D' in Table 2), 'flexible' (denoted 'X'), or 'uplink' (denoted 'U'), if dynamic Slot Format Indication (SFI) is used where the format of a slot is indicated with DCI Format 2_0. As an alternative to this, a semi-static TDD UL-DL configuration may be used where the TDD configuration is RRC configured using the IE TDD-UL-DL-ConfigCommon:

```
TDD-UL-DL-ConfigCommon ::=          SEQUENCE {
  -- Reference SCS used to determine the time domain boundaries in the UL-DL
pattern which must be common across all subcarrier specific
  -- virtual carriers, i.e., independent of the actual subcarrier spacing using for data
transmission.
  -- Only the values 15 or 30 kHz (<6GHz), 60 or 120 kHz (>6GHz) are applicable.
  -- Corresponds to L1 parameter 'reference-SCS' (see 38.211, section FFS_Section)
  referenceSubcarrierSpacing         SubcarrierSpacing
                                     OPTIONAL,
  -- Periodicity of the DL-UL pattern. Corresponds to L1 parameter 'DL-UL-
transmission-periodicity' (see 38.211, section FFS_Section)
  dl-UL-TransmissionPeriodicity      ENUMERATED {ms0p5, ms0p625, ms1,
ms1p25, ms2, ms2p5, ms5, ms10}      OPTIONAL,
  -- Number of consecutive full DL slots at the beginning of each DL-UL pattern.
  -- Corresponds to L1 parameter 'number-of-DL-slots' (see 38.211, Table 4.3.2-1)
  nrofDownlinkSlots                  INTEGER (0..maxNrofSlots)
                                     OPTIONAL,
  -- Number of consecutive DL symbols in the beginning of the slot following the
last full DL slot (as derived from nrofDownlinkSlots).
  -- If the field is absent or released, there is no partial-downlink slot.
  -- Corresponds to L1 parameter 'number-of-DL-symbols-common' (see 38.211,
section FFS_Section).
  nrofDownlinkSymbols                INTEGER (0..maxNrofSymbols-1)
                                     OPTIONAL, -- Need R
  -- Number of consecutive full UL slots at the end of each DL-UL pattern.
  -- Corresponds to L1 parameter 'number-of-UL-slots' (see 38.211, Table 4.3.2-1)
  nrofUplinkSlots                    INTEGER (0..maxNrofSlots)
                                     OPTIONAL,
  -- Number of consecutive UL symbols in the end of the slot preceding the first full
UL slot (as derived from nrofUplinkSlots).
  -- If the field is absent or released, there is no partial-uplink slot.
  -- Corresponds to L1 parameter 'number-of-UL-symbols-common' (see 38.211,
section FFS_Section)
  nrofUplinkSymbols                  INTEGER (0..maxNrofSymbols-1)
                                     OPTIONAL -- Need R
```

That is, the number of UL and DL slots, as well as the guard period (the number of UL and DL symbols in the flexible slot(s)) may be almost arbitrarily configured within the TDD periodicity. This allows for very flexible uplink-downlink configurations.

TABLE 2

NR slot formats (from 38.211, Table 4.3.2-3)

| Format | \multicolumn{14}{c}{Symbol number in a slot} | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |

TABLE 2-continued

NR slot formats (from 38.211, Table 4.3.2-3)

| Format | \multicolumn{14}{c}{Symbol number in a slot} | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | X | D | D | D | D | D | D | D | D | X |
| 47 | D | D | D | D | X | X | D | D | D | D | D | D | X | X |
| 48 | D | D | X | X | X | X | D | D | X | X | X | X | X | X |
| 49 | D | X | X | X | X | X | X | D | X | X | X | X | X | X |
| 50 | X | U | U | U | U | U | X | U | U | U | U | U | U | U |
| 51 | X | X | U | U | U | U | X | X | U | U | U | U | U | U |
| 52 | X | X | X | U | U | U | X | X | X | U | U | U | U | U |
| 53 | X | X | X | U | U | U | X | X | X | X | U | U | U | U |
| 54 | D | D | D | D | D | X | U | D | D | D | D | D | X | U |
| 55 | D | D | X | U | U | U | U | D | D | X | U | U | U | U |
| 56 | D | X | U | U | U | U | U | D | X | U | U | U | U | U |
| 57 | D | D | D | X | U | U | U | D | D | D | X | U | U | U |
| 58 | D | D | X | U | U | U | U | D | D | X | U | U | U | U |
| 59 | D | X | U | U | U | U | U | D | X | U | U | U | U | U |
| 60 | D | X | X | X | X | X | U | D | X | X | X | X | X | U |
```

TABLE 2-continued

NR slot formats (from 38.211, Table 4.3.2-3)

| For-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 61 | D | D | X | X | X | X | U | D | D | X | X | X | X | U |
| 62-255 | Reserved | | | | | | | | | | | | | |

To avoid severe interference between downlink and uplink transmissions between different cells, neighbor cells should have the same downlink/uplink configuration. If this is not done, uplink transmission in one cell may interfere with downlink transmission in the neighboring cell and vice versa.

In reconfigurable TDD systems, the TDD configuration may be changed depending on traffic demands on a cell-by-cell basis. As a result, two neighboring base stations may use respective different resource allocations for UL and DL, which may result in DL-to-UL interference, i.e., transmitting base station to receiving base station interference. DL-to-UL interference, will be referred to herein as cross-link interference (CLI), occurs when one base station, referred to herein as a base station, is transmitting on the DL, while a second base station is receiving transmissions from a UE in the UL. The different resource allocations result in interference.

Figure 5:
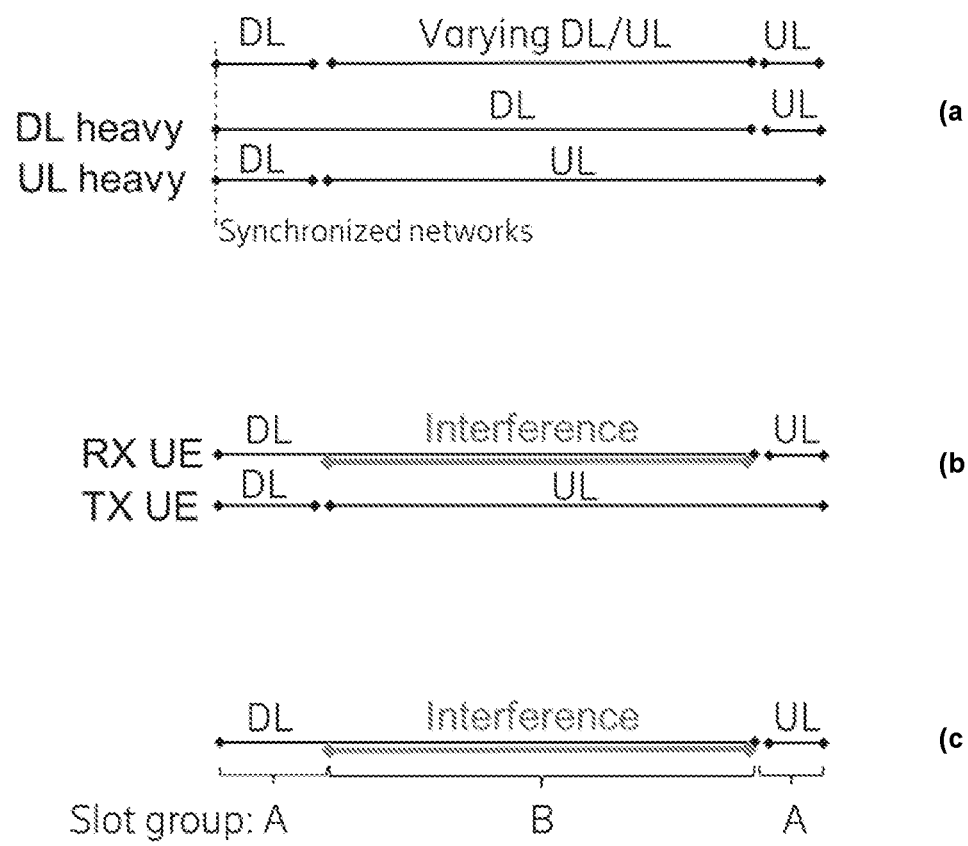
FIG. 5 (a)-(c) illustratively shows TDD configurations of two neighbouring cells, according to an embodiment of the present disclosure.

FIG. 5 illustratively shows the TDD configurations of two neighbouring cells. It is assumed that the cells are synchronized. If the cells belong to different networks it is assumed that the networks are synchronized.

In FIG. 5a, one of the UEs has a TDD configuration that is more 'downlink heavy'. The definition of 'downlink heavy' is that the TDD configuration has more subframes or slots available for DL. 'Uplink heavy' is defined by TDD configurations having more subframes or slots available for UL. As can be seen from FIG. 5a, subframes or slots where one cell is configured for uplink and the other cell is configured for downlink, or vice versa, are referred to as varying subframes or slots. Subframes or slots where one cell is configured for uplink and the other cell is also configured for uplink, both cells may also be configured for downlink, are referred to as fixed subframes or slots. CLI mainly occurs in the varying subframes or slots as both cells/networks transmit in the same direction in the fixed subframes or slots.

Figure 2:
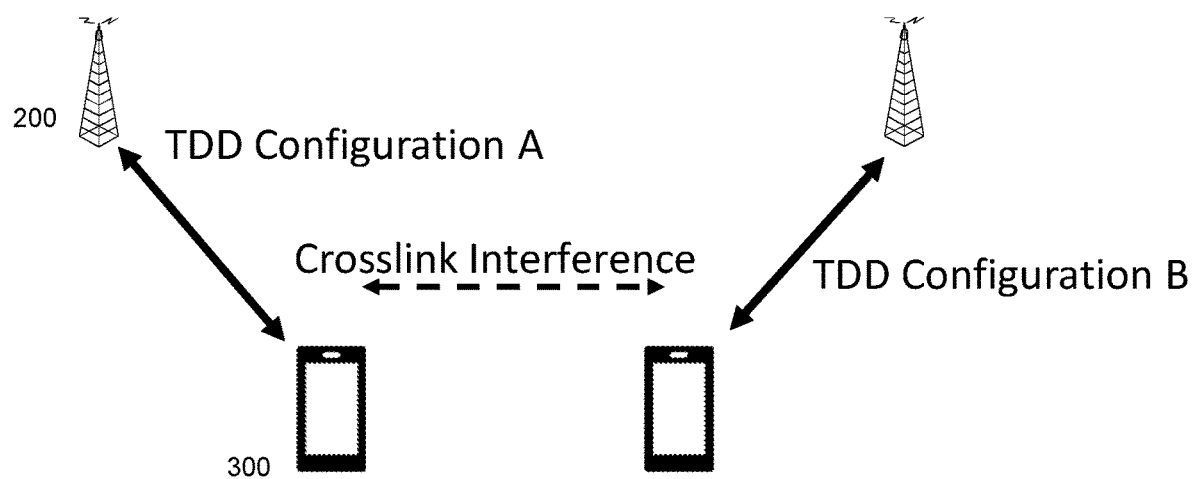
FIG. 2 illustrates a network node and a wireless device operating in one cell using a TDD configuration (TDD configuration A), and another network node and another wireless device operating in another neighboring cell using another TDD configuration (TDD configuration B), according to an embodiment of the present disclosure.

If two UEs belong to different cells that are in turn scheduled with different uplink-downlink configurations and are near each other as illustrated in FIG. 2, the UE with more DL slots, referred to as Rx UE, will experience interference on the varying slots used for downlink. The UE with more UL slots, referred to as Tx UE, may experience less crosslink interference compared to the Rx UE. This is illustratively shown in FIG. 5b, where it is assumed that the neighbouring UEs are so close that they may experience CLI and other interferences due to their proximity to each other.

In FIG. 5c the slots are grouped into at least two categories of slots. The first group, Group A, includes varying slots, i.e. slots that are mainly affected by crosslink interference. The second group, Group B, includes slots that are not affected by crosslink interference.

In another embodiment the slots are grouped into at least two categories of groups. The first group, Group A, includes varying slots, i.e. slots that are more likely to be affected by interference, crosslink interference in particular. The second group, Group B, includes slots that are less likely to be affected by crosslink interference. The slots can be grouped into further groups based on how likely it is that they are affected by crosslink interference.

In cases where regulations allow only a few different uplink-downlink configurations to be used, the grouping of slots can be configured once and then kept fixed. In this case, the actual uplink-downlink configurations used for the cells in the network don't have to be known when configuring the grouping, it is enough to know that the uplink-downlink configuration is one of a few possible configurations. The grouping may also be dynamic, taking into account which uplink-downlink configurations adjacent cells (co-channel or adjacent channel) are configured with. If these configurations change, the grouping may be updated.

The at least two slot groups are then treated separately for link adaptation and/or scheduling, thereby reducing the impact of the cross-link interference on e.g. throughput.

Figure 6:
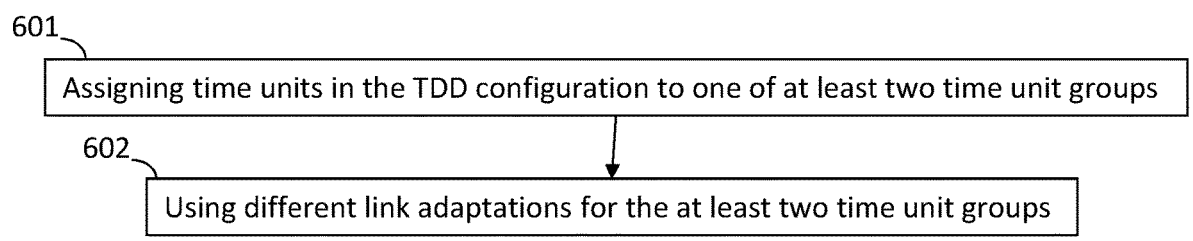
FIG. 6 illustrates a method performed by a network node, according to an embodiment of the present disclosure.

FIG. 6 shows method steps of embodiments disclosed herein. The method is performed by a network node (300) and purpose of the method is to reduce the impact of crosslink interference on transmissions between a wireless device (200) and a network node (300). The wireless device is configured with a certain TDD configuration in the cell, for example one of the configurations in Table 1 or Table 2. The wireless device may experience CLI from another neighbouring wireless device operating in a neighbouring cell using another TDD configuration. For example, one wireless device may belong to a cell configured with uplink-downlink configuration 2 in Table 1 and the neighbouring wireless device may belong to a cell configured with uplink-downlink configuration 3 in Table 1. TDD configurations are divided into different time units for at least downlink, DL, and uplink, UL, transmission, and therefore the wireless device can either receive or transmit in a time unit. A time unit may have the length of a subframe, a slot and/or a symbol. The time unit is in some embodiments a time period, for example 1 ms. In the illustrative embodiments subframe, slot and symbol may be interchangeably used. Although some illustrative embodiments are disclosed for slot time unit, the embodiments are also applicable to symbol time unit or subframe time unit.

In step 601 the network node assigns time units in a TDD configuration to one of at least two time unit groups. The assignment of a time unit to a time unit group is based on the TDD configurations that are used in the serving cell and in at least one neighbouring cell.

Figure 7:
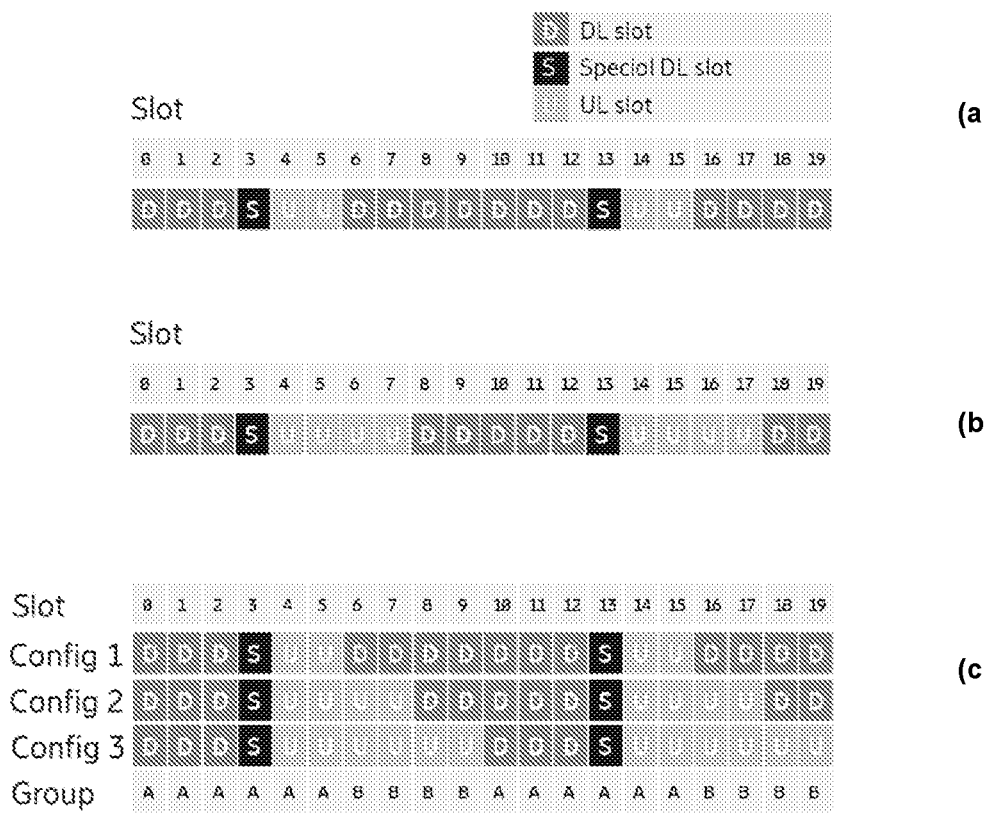
FIG. 7 (a)-(c) shows slot divisions and TDD configurations, according to an embodiment of the present disclosure.

In an exemplary embodiment it is assumed a first NR TDD slot configuration for 30 kHz sub-carrier spacing as shown in FIG. 7a. The TDD configuration includes DL slots (D), UL slots (U), and special DL slots(S). This could represent the TDD configuration used by the serving cell and a wireless device. Another exemplary TDD configuration with more uplink slots is shown in FIG. 7b. This TDD configuration could represent the TDD configuration used in the neighbouring cell by the neighbouring wireless device. In the exemplary embodiment the time units would be assigned to the various groups as follows:

Group A fixed: Slot {0, 1, 2, 3, 4, 5, 8, 9, 10, 11, 12, 13, 14, 15, 18, 19}

Group B varying: Slot {6, 7, 16, 17}

It is assumed that the special DL slots(S) have the same configuration of DL and UL symbols in each of the two example configurations. There will therefore not be any cross-link interference in the special slots in this exemplary embodiment and these slots can be included in Group A. Group B contains the slots that can be either DL or UL, depending on to which cell (and thereby to which TDD configuration) the wireless device belongs.

The slots assigned to Group A and Group B are then treated separately for link adaptation and/or scheduling. Different link adaptation methods are applied for the two Groups, step 602.

In some embodiments the link adaptation is separated into two outer loops for the different Groups. Block errors caused by cross-link interference due to different TDD configurations in neighbouring cells will cause the outer loop to increase margin and use more robust Modulation and Coding Scheme (MCS) for slots in Group B compared to slots in Group A. In one embodiment the signal-to-noise ratio (SNR) threshold for selection of a specific Modulation and Coding Scheme, MCS, is different for Group A and Group B.

In one exemplary embodiment the Downlink Control Information, DCI, for PUSCH scheduling of varying slots 6, 7, 16 and 17 are allocated into varying DL slots 6, 7, 16 and/or 17. DCI for PUSCH scheduling of fixed UL slots 4, 5, 14 and 15 are allocated into fixed DL slots 0-3, 8-12 and/or 18-19.

In one exemplary embodiment, the ACK/NACK response to PDSCH on varying slots 6, 7, 16 and 17 are allocated into varying UL slots 6, 7, 16 and/or 17. ACK/NACK response to PDSCH on fixed DL slots 0-3, 8-12 and/or 18-19 are allocated to fixed UL slots 4, 5, 14 and 15.

Exemplary embodiments are directed to transmitting all control signalling in fixed slots with no cross-link interference, thereby reducing the error-rate of the control signalling. However, in some embodiments the amount of control data to transmit may be too large to fit in the fixed slots. Therefore, the DCI and HARQ ACK/NACK are preferably allocated to slots in the same group as the actual data transmission.

In another embodiment the control signals (RLC, RRC and higher layer) are scheduled on slots in Group A to maintain connectivity also for wireless devices exposed to severe TDD interference such as CLI.

Different HARQ processes may be used for the different time-slot groups. Any retransmissions of data from one time-slot group will then be transmitted in a slot belonging to the same time-slot group. This may be advantageous since the number of bits to be transmitted in the time-frequency resources of one slot may differ significantly between the different groups depending on MCS selection offsets, different average SINR, etc. For a packet transmitted over fixed slots first. (means a large packet can be transmitted since MCS is typically high) and then being retransmitted over varying slots, capable of carrying much less data, the amount of additional information received in the retransmission may not be enough for correct decoding of the packet.

In some embodiements, different HARQ processes are used for different time unit groups. Further, the HARQ processes associated with the different time unit groups may be associated with different link adaptation outer loops.

Different outer loop methods and characteristics, for example SINR offsets, can be used for the two slot groups. For Group B, filtering such as windowing can be applied to not compensate for single block errors to limit the impact of single TDD scheduling collision occurrences. If co-scheduling of two wireless devices close to each other is unlikely, this will improve the overall throughput and capacity.

In another embodiment, the set of TDD configurations may be limited to only a few allowed configurations. Group A may be selected to include only slots where all possible configurations have the same type of slots. The varying slots included in group B are all slots that are not the same type in each of the allowed configurations. FIG. 7c shows an example embodiment with three allowed TDD configurations. The Figure also shows how the slots are divided into Group A and Group B, where Group A includes the fixed slots and Group B includes the varying slots.

Thus, the assignment of a time unit to a time unit group is such that the time units are assigned to time unit groups depending on how much crosslink interference they are likely to be subjected to. Thus the time unit groups may in some embodiments be Group A and Group B as described above and in other embodiments the assignment of time units to the at least two time unit groups is such that time units that will, or that possibly will, experience cross-link interference from the neighbouring cell using another TDD configuration are assigned to one time unit group and the other time units in the TDD configuration are assigned to another time unit group.

Figure 8:
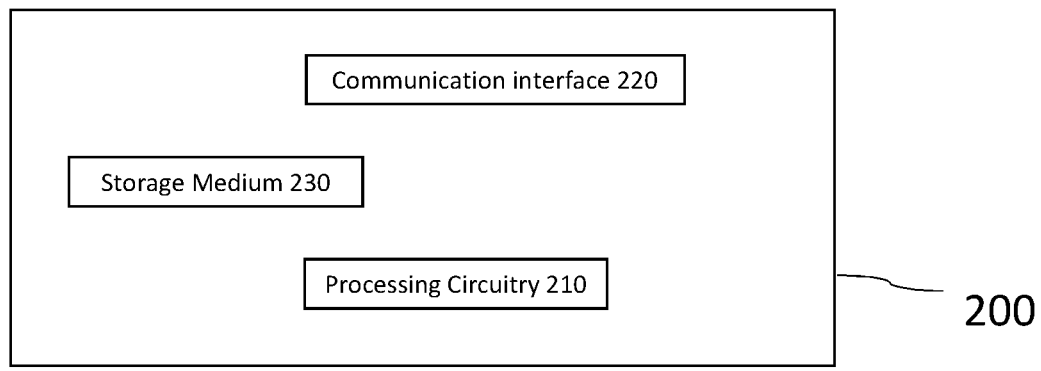
FIG. 8 schematically illustrates, in terms of a number of functional units, components of a network node, according to an embodiment.

FIG. 8 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 910 (as in FIG. 10), e.g. in the form of a storage medium 230 or memory. The processing circuitry 210 may further be provided as at least one application specific integrated circuit (ASIC), or field programmable gate array (FPGA).

Particularly, the processing circuitry 210 is configured to cause network node 200 to perform a set of operations, or steps, 601-602, as disclosed above. For example, the storage medium or memory 230 may store the set of operations, and the processing circuitry 210 may be configured to retrieve the set of operations from the storage medium 230 to cause network node 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. Network node 200 may further comprise a communications interface 220 at least configured for communications with other nodes, device, functions, and notes of the communications network 100a. As such the communications interface 220 may comprise one or more transmitters and receivers, comprising analogue and digital components. Signals could be transmitted from, and received by, a network node 200 using the communications interface 220.

The processing circuitry 210 controls the general operation of network 200 e.g. by sending data and control signals to the communications interface 220 and the storage medium 230, by receiving data and reports from the communications interface 220, and by retrieving data and instructions from the storage medium 230. Other components, as well as the related functionality, of network node 200 are omitted in order not to obscure the concepts presented herein.

Figure 9:
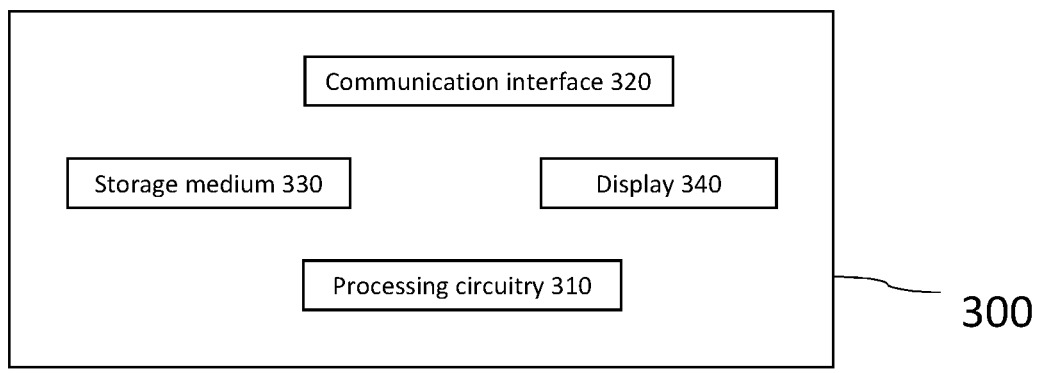
FIG. 9 schematically illustrates, in terms of a number of functional units, components of a wireless device (UE), according to an embodiment.

FIG. 9 schematically illustrates, in terms of a number of functional units, the components of a wireless device (UE) 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 910 (as in FIG. 10), e.g. in the form of a storage medium 330 or memory. The processing circuitry 310 may further be provided as at least one application specific integrated circuit (ASIC), or field programmable gate array (FPGA).

Particularly, the processing circuitry 310 is configured to cause UE 300 to perform a set of operations as disclosed above. For example, the storage medium or memory 330 may store the set of operations, and the processing circuitry 310 may be configured to retrieve the set of operations from the storage medium 330 to cause UE 300 to perform the set of operations. The set of operations may be provided as a set of executable instructions.

Thus the processing circuitry 310 is thereby arranged to execute methods as herein disclosed. The storage medium 330 may also comprise persistent storage, which, for example, can be any single one or combination of magnetic memory, optical memory, solid state memory or even remotely mounted memory. UE 300 may further comprise a communications interface 320 at least configured for communications with other nodes, device, functions, and notes of the communications network 100a. As such the communications interface 320 may comprise one or more transmitters and receivers, comprising analogue and digital components. Signals could be transmitted from, and received by, a UE 300 using the communications interface 320.

The processing circuitry 310 controls the general operation of UE 300 e.g. by sending data and control signals to the communications interface 320 and the storage medium 330, by receiving data and reports from the communications interface 320, and by retrieving data and instructions from the storage medium 330. Optionally the UE may include a display 340 but the embodiments herein are not limited thereto. Other components, as well as the related functionality, of UE 300 are omitted in order not to obscure the concepts presented herein.

Figure 10:
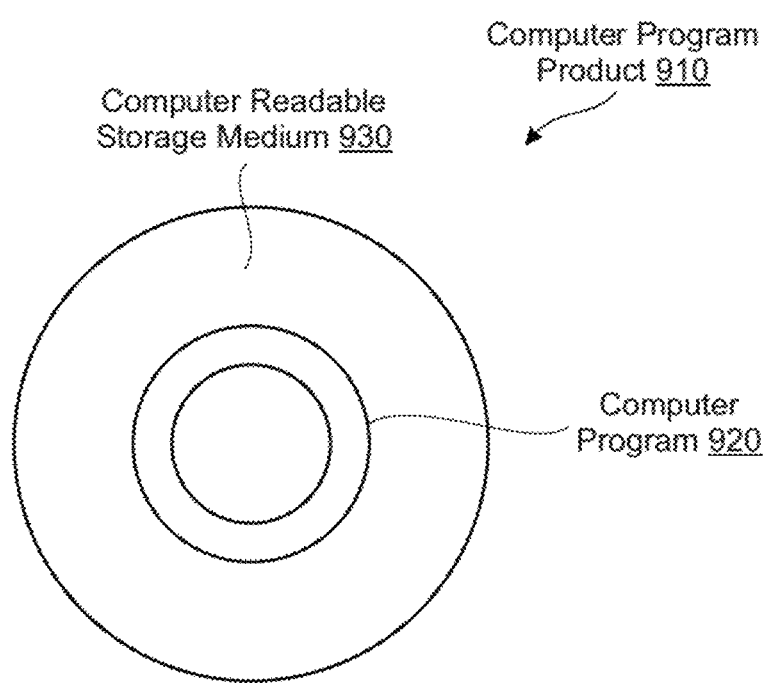
FIG. 10 shows an example of a computer readable storage medium comprising a computer program product, according to an embodiment.

FIG. 10 shows one example of a computer program product 910 comprising computer readable storage medium 930. On this computer readable storage medium 930, a computer program 920 can be stored, which computer program 920 can cause the processing circuitry 210 or 310 and thereto operatively coupled entities and devices, such as the communications interface 220 or 320 and the storage medium 230 or 330, to execute methods according to embodiments described herein. The computer program 920 and/or computer program product 910 may thus provide means for performing any steps as herein disclosed.

In the example of FIG. 8, the computer program product 910 is illustrated as an optical disc, such as a CD (compact disc) or a DVD (digital versatile disc) or a Blu-Ray disc. The computer program product 910 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920 is here schematically shown as a track on the depicted optical disk, the computer program 920 can be stored in any way which is suitable for the computer program product 910.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method in a network node for reducing impact of interference in a cell from at least another neighbouring cell, the cell operating using a time division duplex (TDD) configuration, and the neighbouring cell operating using another TDD configuration, where the TDD configuration and the another TDD configuration are each divided into different time units for at least downlink (DL) and uplink (UL) transmissions, the method comprising:
   assigning time units in the TDD configuration to one of at least two time unit groups, where assignment of a time unit to a time unit group is based on the another TDD configuration used in the neighbouring cell, where different HARQ processes are used for the at least two different time unit groups, and where the HARQ processes associated with the at least two different time unit groups are associated with different link adaptation outer loops; and
   using different link adaptation methods for the at least two time unit groups.

2. The method according to claim 1, where one time unit group comprises fixed slots and an at least another time unit group comprises varying slots.

3. The method according to claim 1, where assignment of time units to the at least two time unit groups is such that time units experiencing cross-link interference from the neighbouring cell using the another TDD configuration are assigned to one group and the other time units in the TDD configuration are assigned to another group.

4. The method according to claim 3, where a more robust Modulation and Coding Scheme (MCS) is used for the time unit group experiencing cross-link interference from the neighbouring cell using the another TDD configuration compared to the MCS used for the at least another time unit group.

5. The method according to claim 3, where a signal-to-noise ratio (SNR) threshold for selection of a MCS is different for the time unit group most experiencing cross-link interference from neighboring cell using the another TDD configuration compared to the SNR threshold for the other time unit group not experiencing cross-link interference.

6. The method according to claim 1, where using different link adaptation methods comprises using different link adaptation outer loop instances for the at least two time unit groups.

7. The method according to claim 1, where the HARQ-feedback (ACK/NACK) associated with a time unit group in downlink is transmitted in a time unit in the same time unit group in uplink.

8. The method according to claim 1, where a UL Downlink Control Information (DCI) associated with a UL time unit group is transmitted in the same time unit group in downlink.

9. The method according to claim 1, where control signalling is transmitted in the time unit group experiencing the least interference from the neighbouring cell using the another TDD configuration.

10. The method according to claim 9, wherein the control signaling comprises radio link control (RCL) signaling or radio resource control (RRC) signalling.

11. The method according to claim 1, where the time units are the time units for at least one of sub-frames, slots and symbols.

12. The method according to claim 1, where the time units in the time unit groups are scheduled downlink time units, uplink time units, special downlink time units or flexible time units.

13. The method according to claim 1, where the network node and a wireless device operate in the cell using the TDD configuration, and another network node and another wireless device operate in the neighbouring cell using the another TDD configuration.

14. The method according to claim 13, where the impact of the interference in the cell from the at least another neighbouring cell is reduced in the wireless device and/or the network node operating the cell.

15. A network node configured to reduce impact of interference in a cell from at least another neighbouring cell, the cell configured to operate using a time division duplex (TDD) configuration, and the neighbouring cell configured to operate using another TDD configuration, where the TDD configuration and the another TDD configuration are each divided into different time units for at least downlink (DL) and uplink (UL) transmissions, network node comprising:
 a processing circuitry and
 a memory for storing program code that is executable by the processor circuitry whereby the network node is configured to:
  assign time units in the TDD configuration to one of at least two time unit groups, where assignment of a time unit to a time unit group is based on the another TDD configuration used in the neighbouring cell, where different HARQ processes are used for the at least two different time unit groups, and where the HARQ processes associated with the at least two different time unit groups are associated with different link adaptation outer loops; and
  use different link adaptation methods for the at least two time unit groups.

* * * * *